(12) United States Patent
Lugo et al.

(10) Patent No.: US 8,517,665 B2
(45) Date of Patent: Aug. 27, 2013

(54) THRUST BEARING SHAFT FOR THRUST AND JOURNAL AIR BEARING COOLING IN AN AIR MACHINE

(75) Inventors: Valentina Lugo, Hartford, CT (US); Darryl A. Colson, West Suffield, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 458 days.

(21) Appl. No.: 12/974,063

(22) Filed: Dec. 21, 2010

(65) Prior Publication Data

US 2012/0152383 A1  Jun. 21, 2012

(51) Int. Cl.
*F15D 1/00* (2006.01)

(52) U.S. Cl.
USPC .......................................... 415/107; 415/229

(58) Field of Classification Search
USPC .............. 415/104, 105, 106, 107, 229, 216.1, 415/93, 96; 384/107, 121; 29/889.2, 898.041, 29/898.07
See application file for complete search history.

(56) References Cited

U.S. PATENT DOCUMENTS

| | | | |
|---|---|---|---|
| 4,896,975 A | 1/1990 | Bescoby et al. | |
| 6,212,935 B1 | 4/2001 | Shiozaki et al. | |
| 6,249,366 B1 | 6/2001 | Hinton et al. | |
| 6,328,475 B1 | 12/2001 | Jager | |
| 6,450,781 B1 | 9/2002 | Petrovich et al. | |
| 6,455,964 B1 | 9/2002 | Nims | |
| 6,664,686 B2 | 12/2003 | Ichiyama | |
| 7,342,332 B2 | 3/2008 | McAuliffe et al. | |
| 7,394,175 B2 | 7/2008 | McAuliffe et al. | |
| 7,648,279 B2 | 1/2010 | Struziak et al. | |
| 7,648,280 B2 | 1/2010 | Struziak et al. | |
| 2012/0064815 A1* | 3/2012 | Beers et al. | 454/71 |

* cited by examiner

*Primary Examiner* — Edward Look
*Assistant Examiner* — Maxime Adjagbe
(74) *Attorney, Agent, or Firm* — Carlson, Gaskey & Olds, PC

(57) ABSTRACT

A thrust bearing shaft has a radially enlarged thrust disk to be mounted between two static housing surfaces in an air cycle machine. A first portion of the thrust bearing shaft extends from a first face of the thrust disk. A second portion extends from a second opposed face of the thrust disk. The second portion has sealing ribs and six holes. The sealing ribs are spaced closer to the thrust disk than are the holes. A ratio of a distance from an end of the second portion to a center of the holes compared to a distance from the end of the second portion to the second face of the thrust disk is between 0.20 and 0.22. In addition, an air cycle machine incorporating the thrust bearing shaft, and a method of assembling the thrust bearing shaft into an air cycle machine are disclosed.

11 Claims, 2 Drawing Sheets

THRUST BEARING SHAFT FOR THRUST AND JOURNAL AIR BEARING COOLING IN AN AIR MACHINE

BACKGROUND

This application relates to a thrust bearing shaft incorporated into an air cycle machine which comprises both a turbine and turbine-driven compressor rotor.

Air cycle machines are known, and may include a compressor rotor driven by a turbine. The compressed air from the compressor passes downstream across a turbine rotor, driving the turbine rotor to in turn rotate the compressor rotor.

Typically, air bearings support the turbine and compressor rotors. In one known air bearing, cooling air is brought into a bearing cooling inlet. The air passes along thrust bearing surfaces, and then between the shaft and various housing portions. The thrust bearing surfaces are spaced from a disk which rotates with a shaft. The shaft rotates with the turbine and compressor rotor.

The thrust bearing surfaces are on axial sides of the disk. Air passes along both of those surfaces. Air on one side of the disk passes along an outer periphery of the shaft, and air on an opposed side of the disk passes into a bore within the shaft.

SUMMARY

A thrust bearing shaft includes a body having a radially enlarged thrust disk to be mounted between two static housing surfaces in an air cycle machine, and provides thrust bearing surfaces. A first portion of the thrust bearing shaft extends from a first face of the thrust disk. A second portion of the thrust bearing shaft extends from a second opposed face of the thrust disk. The second portion has sealing ribs and six holes extending through a body of the thrust bearing shaft to a hollow interior. The sealing ribs are spaced closer to the thrust disk than are the holes. A ratio of a distance from an end of the second portion remote from the thrust disk to a center of the holes compared to a distance from the end of the second portion to the second face of the thrust disk is between 0.20 and 0.22.

In addition, an air cycle machine incorporating the thrust bearing shaft, and a method of assembling the thrust bearing shaft into an air cycle machine are disclosed.

These and other features of the present invention can be best understood from the following specification and drawings, the following of which is a brief description.

DETAILED DESCRIPTION

Figure 1:
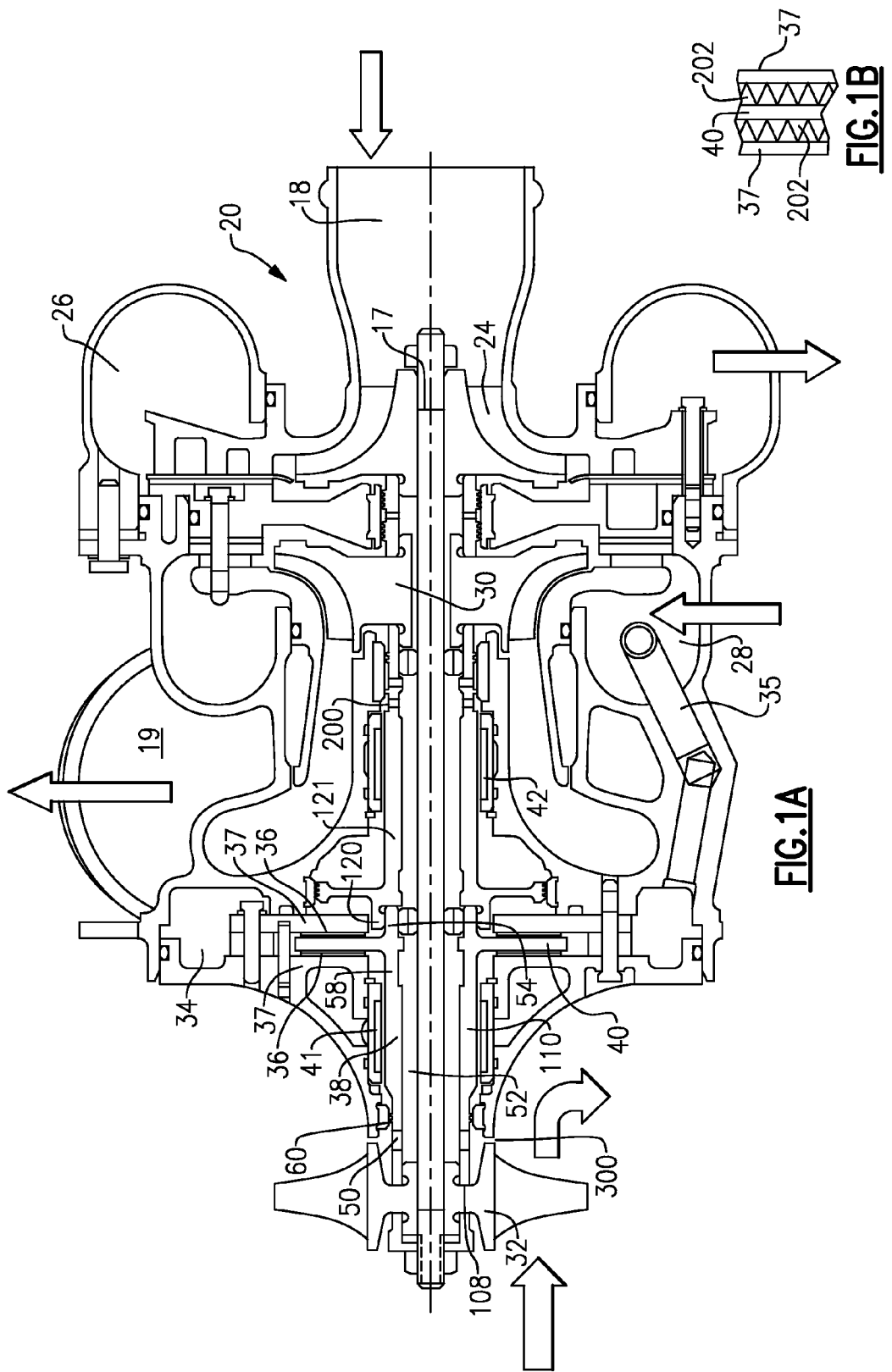
FIG. 1A shows a schematic of an air machine incorporating a thrust shaft.
FIG. 1B is a detail of an axial thrust bearing surface.

As shown in FIG. 1A, an air cycle machine 20 incorporates a compressor inlet 18 delivering air to a compressor rotor 24. The compressor compresses the air and delivers it toward a compressor outlet 26. The compressor outlet 26 may pass to an aircraft air supply system. In addition, a portion of the compressor outlet 26 passes into a turbine inlet 28, and drives a turbine rotor 30 to rotate. The output of the turbine passes to a turbine outlet 19, and is also used as part of an aircraft air supply system.

A tie rod 17 connects the rotors 24 and 30, and further connects to a fan rotor 32.

A cooling air inlet 35 taps air from the turbine inlet 28, and delivers it into a chamber 34. This air passes axially between thrust bearing surfaces 36 on housing portions 37, and a disk 40. Disk 40 is part of a thrust shaft 38. The thrust shaft 38, also referred to as thrust bearing shaft 38, further has a forward extending portion 54 on one side of the disk 40, which is received within a surface 120 in a main shaft 121. The thrust shaft 38 further extends to a plurality of seal ribs 60 which seal on a portion of the housing 37. Axially beyond the seal ribs 60 are a plurality of holes 50. Air passes along both the thrust bearing surfaces 36, and a portion of the air extends to the right as shown in FIG. 1, and along the journal bearing 42. Other air passes to the left, and along the journal bearing 41. The air passing along the journal bearing 42 reaches the holes 200, and can pass into an interior 52 of the thrust shaft 38, and then outwardly of holes 50 and to the outlet 300. The size of the holes helps control the relative volumes of air passing through the two paths.

The thrust shaft 38 has a portion 110 connecting a smaller portion 61 to the disk 40.

As shown in FIG. 1B, the thrust bearing surfaces 36 of FIG. 1A are defined between the housings 37 and corrugated bearing members 202. Air passages are defined between the disk 40, and the corrugations 202. In addition, further air passes are defined between the corrugations 202 and the housings 37.

Figure 2:
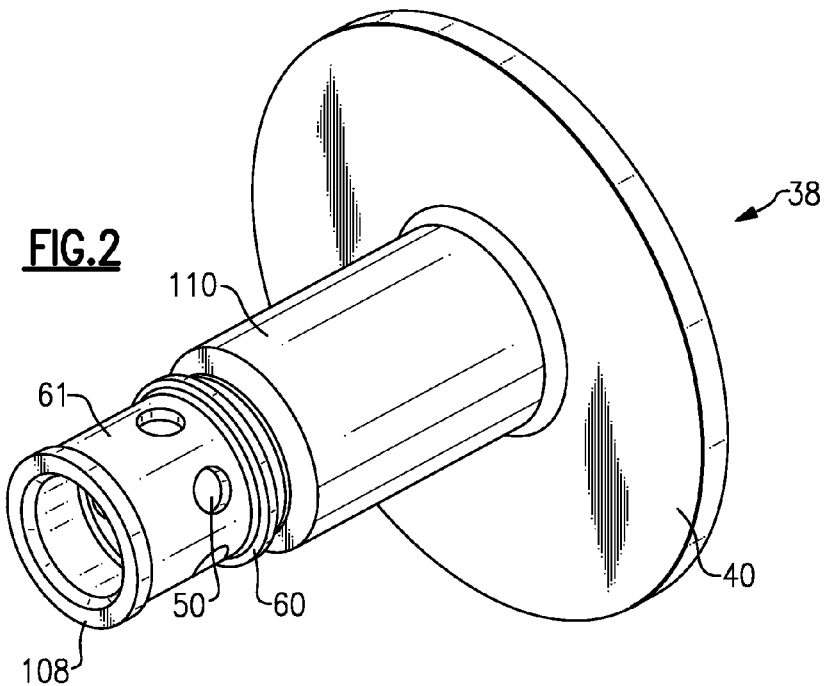
FIG. 2 is a perspective view of the thrust shaft.

As shown in FIG. 2, the thrust shaft 38 has disk 40, portion 110, smaller portion 61 including the holes 50, and the ribs 60 and extending to end 108. As can be appreciated, the portion 110 is positioned between disk 40 and the smaller portion 61. In a sense, the portions 110 and 61 could be seen as "sub-portions" of a portion of the shaft 38 extending from one face of the disk 40. As is apparent, the portion 110 has a greater outer diameter than the portion 61.

Figure 3:
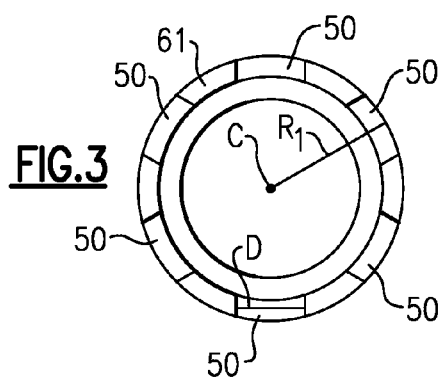
FIG. 3 is a cross-sectional view through one portion of the thrust shaft.

As shown in FIG. 3, there are six holes 50 spaced by 60° about a centerline C, which extend through a body of the thrust bearing shaft 38 to hollow interior 52. Intermediate surfaces of portion 61 separate the holes 50. In one embodiment, the holes 50 had a diameter D of 0.188" (0.478 cm). In addition, a radius $R_1$ is defined to the outer periphery of the portion 61. The holes 50 are relatively large compared to the prior art.

Figure 4:
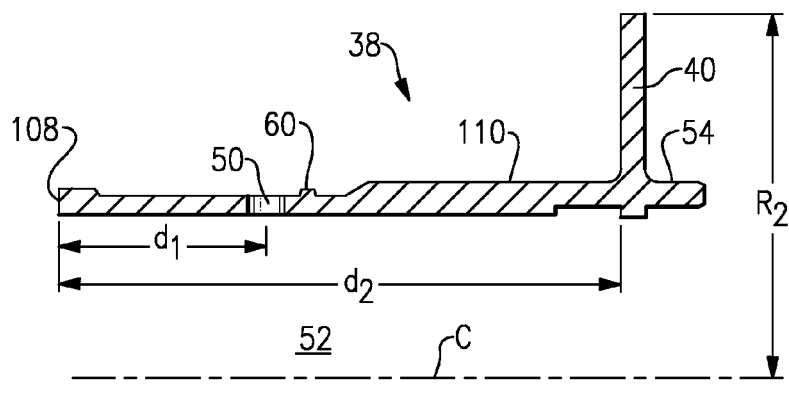
FIG. 4 shows a plurality of dimensional details of the thrust shaft.

FIG. 4 shows several axial lengths for the thrust shaft 38. In particular, a distance $d_1$ is defined between a center of the hole 50 and the end 108. A distance $d_2$ can be defined between the end 108 and the face of the disk 40 spaced toward the holes 50.

A radius $R_2$ is defined to the outer periphery of the disk 40.

In embodiments of this invention, $d_1$ was 0.48" (1.22 cm); $d_2$ is 2.28" (5.79 cm). $R_1$ is 0.36" (0.91 cm), and $R_2$ is 1.31" (3.33 cm).

In embodiments, a ratio of D to $R_1$ was between 0.508 and 0.537. A ratio of D to $R_2$ was between 0.140 and 0.147. A ratio of $d_1$ to $d_2$ was between 0.20 and 0.22.

In a method of assembling an air cycle machine, the thrust shaft 38 is secured to the shaft 121, such as by having one of the shafts placed in liquid nitrogen to reduce its size, or heating the other shafts. Then, the portion 54 extending forwardly is caused to be force or interference fit within the portion 120. The tie rod 17 secures the several rotors, and the combined shafts 121 and 38.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A thrust bearing shaft comprising:
a body having a radially enlarged thrust disk to be mounted between two static housing surfaces in an air cycle machine, and provides thrust bearing surfaces;
a first portion of the thrust bearing shaft extending from one face of said thrust disk;
a second portion of the thrust bearing shaft extending from an opposed second face of said thrust disk, and said second portion having sealing ribs, and six holes extending through a body of said thrust bearing shaft to a hollow interior, said sealing ribs being spaced closer to said thrust disk than are said holes; and
a ratio of a distance from an end of said second portion remote from said thrust disk to a center of said holes to a distance from the end of said second portion to the second face of said thrust disk being between 0.20 and 0.22.

2. The thrust bearing shaft as set forth in claim 1, wherein a ratio of a diameter of said holes to a radius to the second portion of said thrust bearing shaft at a location of said holes being between 0.508 and 0.537.

3. The thrust bearing shaft as set forth in claim 2, wherein a ratio of a diameter of said holes to a radius to an outer periphery of said thrust disk being between 0.140 and 0.147.

4. The thrust bearing shaft as set forth in claim 2, wherein said second portion includes two sub-portions with a first sub-portion including said holes and said sealing ribs, and a second sub-portion spaced between said first sub-portion and said disk, and said second sub-portion having a greater outer diameter than said first sub-portion.

5. An air cycle machine comprising:
a compressor rotor and a turbine rotor secured to rotate together; and
an air bearing system including an inlet for supplying air into a housing, air flowing through a chamber in the housing along two thrust bearing surfaces, said thrust bearing surfaces being defined between a housing, and a disk on a thrust bearing shaft, said thrust bearing shaft including the disk, a first portion of the thrust bearing shaft extending from one face of said disk, a second portion of the thrust bearing shaft extending from an opposed second face of said disk, and said second portion having sealing ribs, and six holes extending through a body of said thrust bearing shaft to a hollow interior, said sealing ribs being spaced closer to said disk than said holes; and
a ratio of a distance from an end of said second portion remote from said disk to a center of said holes to a distance from the end of said second portion to the second face of said disk being between 0.20 and 0.22.

6. The air cycle machine as set forth in claim 5, wherein a ratio of a diameter of said holes to a radius to the second portion of said thrust bearing shaft at a location of said holes being between 0.508 and 0.537.

7. The air cycle machine as set forth in claim 6, wherein a ratio of a diameter of said holes to a radius to an outer periphery of said disk being between 0.140 and 0.147.

8. The air cycle machine as set forth in claim 6, wherein said second portion includes two sub-portions with a first sub-portion including said holes and said sealing ribs, and a second sub-portion spaced between said first sub-portion and said disk, and said second sub-portion having a greater outer diameter than said first sub-portion.

9. The air cycle machine as set forth in claim 5, wherein journal bearings supporting the thrust bearing shaft in the housing, and supporting a second shaft within the housing, with air passing along each of said thrust bearing surfaces, and then along said journal bearings.

10. The air cycle machine as set forth in claim 9, wherein the first portion of said thrust bearing shaft being secured to an end of said second shaft.

11. A method of assembling a thrust bearing shaft into an air cycle machine comprising the steps of:
providing a thrust bearing shaft having a radially enlarged thrust disk to be mounted between two static housing surfaces in an air cycle machine, a first portion of the thrust bearing shaft extending from one face of said thrust disk, a second portion of the thrust bearing shaft extending from an opposed second face of said thrust disk, and said second portion having sealing ribs, and six holes extending through a body of said thrust bearing shaft to a hollow interior, said sealing ribs being spaced closer to said thrust disk than are said holes, a ratio of a distance from an end of said second portion remote from said thrust disk to a center of said holes to a distance from the end of said second portion to the second face of said thrust disk being between 0.20 and 0.22;
inserting said thrust bearing shaft into a housing with said thrust disk being positioned between housing portions to define the thrust bearing surfaces; and
securing the first portion of said thrust bearing shaft to an end of a second shaft.

* * * * *